(12) United States Patent
Foebel et al.

(10) Patent No.: US 10,305,824 B2
(45) Date of Patent: May 28, 2019

(54) DYNAMIC HIERARCHY BASED MESSAGE DISTRIBUTION

(71) Applicant: SAP SE, Walldorf (DE)

(72) Inventors: Florian Foebel, Buerstadt (DE); Bjoern Friedmann, Rheinmuenster (DE); Boris Gruschko, Heidelberg (DE); Martin Strenge, Berlin (DE); Christian Mohr, Heidelberg (DE)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 15/211,675

(22) Filed: Jul. 15, 2016

(65) Prior Publication Data

US 2018/0020046 A1    Jan. 18, 2018

(51) Int. Cl.
*H04L 12/879* (2013.01)
*H04L 29/08* (2006.01)
*G06F 16/27* (2019.01)

(52) U.S. Cl.
CPC ............ *H04L 49/901* (2013.01); *G06F 16/27* (2019.01); *H04L 67/327* (2013.01)

(58) Field of Classification Search
CPC ..................................................... H04L 67/10
See application file for complete search history.

(56) References Cited

U.S. PATENT DOCUMENTS

| | | | | |
|---|---|---|---|---|
| 7,991,764 B2* | 8/2011 | Rathod | ............. | G06F 17/30867 707/713 |
| 9,002,813 B2* | 4/2015 | Gruschko | ............... | G06F 17/30 707/705 |
| 2003/0202468 A1* | 10/2003 | Cain | ....................... | H04L 45/00 370/229 |
| 2005/0120105 A1* | 6/2005 | Popescu | ................... | H04L 41/00 709/223 |
| 2006/0075134 A1* | 4/2006 | Aalto | ....................... | H04L 45/00 709/238 |
| 2007/0233835 A1* | 10/2007 | Kushalnagar | ........... | H04L 12/12 709/223 |
| 2009/0292802 A1* | 11/2009 | Popescu | ................... | H04L 41/00 709/223 |
| 2010/0030734 A1* | 2/2010 | Chunilal | ........... | G06F 17/30867 707/770 |
| 2010/0281007 A1 | 11/2010 | Bailor et al. | | |
| 2010/0284287 A1* | 11/2010 | Venuto | .................. | H04W 40/08 370/252 |
| 2011/0188378 A1* | 8/2011 | Collins | ................. | H04L 41/042 370/236 |
| 2011/0228668 A1 | 9/2011 | Pillai et al. | | |

(Continued)

*Primary Examiner* — Jimmy H Tran
(74) *Attorney, Agent, or Firm* — Mintz Levin Cohn Ferris Glovsky and Popeo, P.C.

(57) ABSTRACT

A distributed database system can include a plurality of nodes. In order to execute a query at the distributed database system, one or more of the plurality of nodes can perform operations included in an execution plan for the query. A first node of the plurality of nodes can group the plurality of nodes into at least a first cluster. The first node can further select a second node to act as a gateway node for the first cluster. The first node can determine that at least one recipient node of a message is included in the first cluster and route the message to the recipient node by at least sending the message to the second node. Related methods and articles of manufacture are also disclosed.

17 Claims, 7 Drawing Sheets

(56) References Cited

U.S. PATENT DOCUMENTS

| | | | | |
|---|---|---|---|---|
| 2012/0158945 A1* | 6/2012 | Goldbach | ............ | H04L 67/1004 |
| | | | | 709/224 |
| 2012/0163384 A1* | 6/2012 | Takase | .................... | H04L 45/36 |
| | | | | 370/392 |
| 2013/0166588 A1* | 6/2013 | Gruschko | ............... | G06F 17/30 |
| | | | | 707/769 |
| 2014/0137237 A1 | 5/2014 | Robinson et al. | | |
| 2015/0149425 A1* | 5/2015 | Friedmann | ........ | G06F 17/30371 |
| | | | | 707/702 |
| 2017/0039137 A1* | 2/2017 | Mukherjee | .......... | G06F 12/0824 |
| 2017/0116315 A1* | 4/2017 | Xiong | ............... | G06F 17/30598 |
| 2018/0367965 A1* | 12/2018 | Palanisamy | ............. | H04W 4/70 |

* cited by examiner

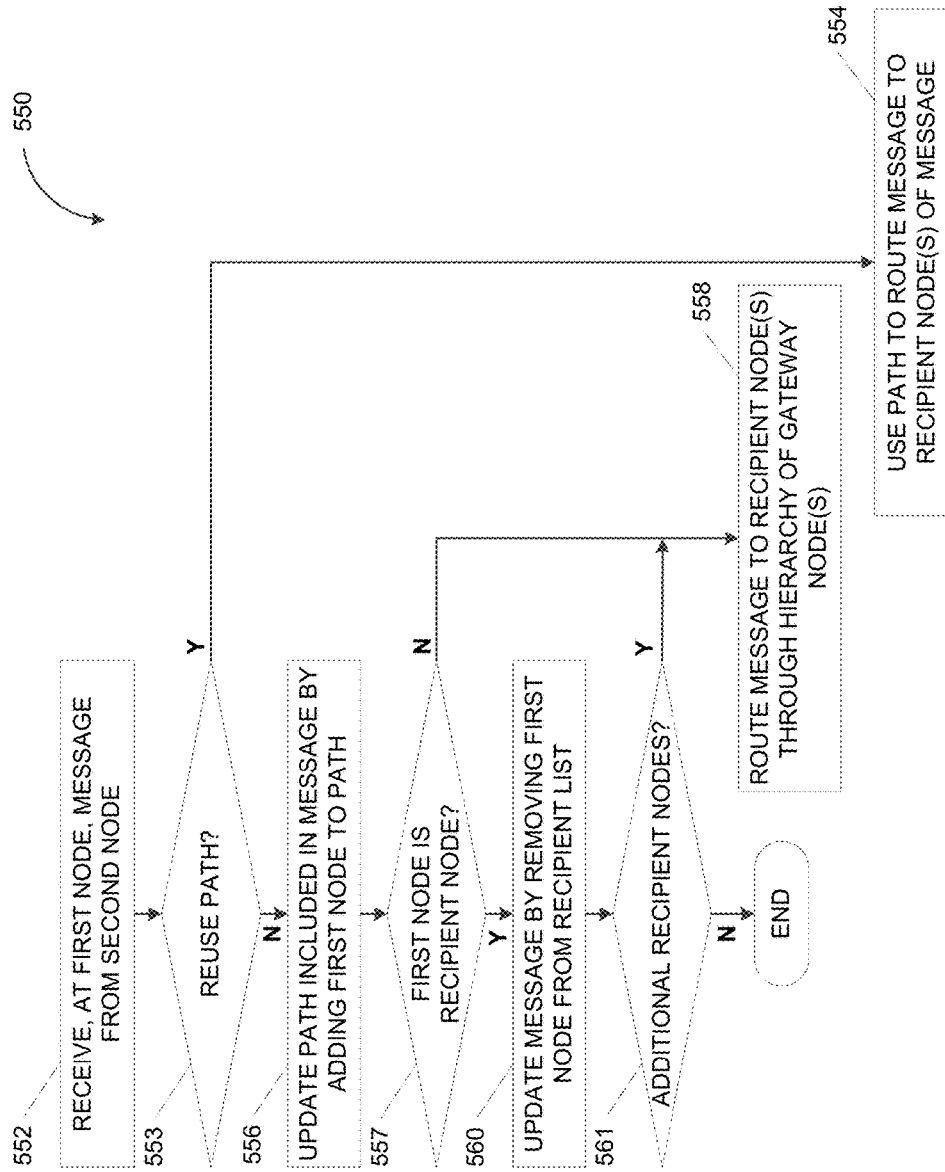

DYNAMIC HIERARCHY BASED MESSAGE DISTRIBUTION

FIELD

The present disclosure generally relates to database processing and, more specifically, to the execution of queries in a distributed database system.

BACKGROUND

Data in a distributed database system is stored across a multitude of physically and/or logically distinct nodes. For example, data in a distributed database system may be stored on different computers. Alternately or additionally, data in a distributed database system may be managed by separate processes. As such, in order to fulfill a query in a distributed database system, multiple nodes are often required to perform one or more specific operations on the data stored at and/or managed by each individual node. For instance, a scheduler node can derive an execution plan setting forth the operations required to fulfill the query as well as the interdependencies amongst the operations. Meanwhile, one or more worker nodes can perform the operations assigned to each worker node in the execution plan. The nodes (e.g., scheduler and worker nodes) that are involved in the execution of the query can exchange messages (e.g., control messages) in order to coordinate the execution of the query pursuant to the execution plan.

SUMMARY

Methods, systems, and articles of manufacture, including computer program products, are provided for message distribution. In some implementations of the current subject matter, there is provided a distributed database system. The distributed database system can include a plurality of nodes. A first node of the plurality of nodes can be configured to: group the plurality of nodes into at least a first cluster; select a second node to act as a gateway node for the first cluster; determine that at least one recipient node of a message is included in the first cluster; and route the message to the recipient node by at least sending the message to the second node.

In some variations, one or more of the features disclosed herein including the following features can optionally be included in any feasible combination. The first node can be further configured to generate the message for broadcasting to one or more recipient nodes. Alternately, the first node receives the message from a third node.

In some variations, the second node can be configured to: receive, from the first node, the message; determine, based at least in part on a transport mode and/or a recipient list of the message, not to reuse a path included with the message; and in response to determining to not reuse the path: determine, based at least in part on the recipient list, that the second node is not a recipient node of the message; and in response to determining that the second node is not a recipient node of the message, route the message to one or more recipient nodes. The second node can route the message to the one or more recipient nodes by at least: grouping the first cluster into at least a second cluster; selecting a third node to act as a gateway node for the second cluster; determining that at least one recipient node of the message is included in the second cluster; and routing the message to the recipient node by at least sending the message to the third node.

In some variations, the second node can be further configured to: in response to determining to not reuse the path, update the path included with the message by at least adding the second node to the path, wherein updating the path generates a new path that can be reused for routing one or more subsequent messages between a sender node and at least one recipient node of the message.

In some variations, the second node can be configured to: determine, based at least in part on the transport mode and/or the recipient list of the message, to reuse the path included with the message; and in response to determining to reuse the path: determine, based at least in part on a position of the second node along the path, that the second node is not a recipient node of the message; and in response to determining that the second node is not a recipient node of the message, route the message to one or more recipient nodes by at least sending the message to a third node along the path. The second node can be configured to identify the third node by at least determining, based least in part on the transport mode of the message, whether to route the message to a previous node along the path or a next node along the path.

In some variations, the first node can be configured to: select a third node to act as another gateway node for the first cluster; and determine send the message to the second node and not the third node in order to balance a load of messages between the second node and the third node. The first node can be further configured to: establish a first connection and a second connection with the second node; utilize the first connection to send the message to the second node; and utilize the second connection to concurrently send a different message to the second node.

In some variations, the message can include a header and a payload, and the header of the message can include a transport mode of the message, a path associated with the message, a path position of the message, and a recipient list of the message. The first node can include a scheduler node configured to: receive, from a client, a query, wherein executing the query requires at least a third node to perform one or more operations; generating, in response to the query, an execution plan for the query; and transmitting, to the third node, at least a portion of the execution plan, wherein the execution plan is included in a payload of the message.

In some variations, the first node can be further configured to: determine a status of the second node; select a third node to act as the gateway node for the first cluster, when the status of the second node is defective and/or offline; and route the message to the recipient node by sending the message to the third node instead of the second node.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5B depicts a flowchart illustrating a process for sending a message consistent with implementations of the current subject matter;

Figure 1:
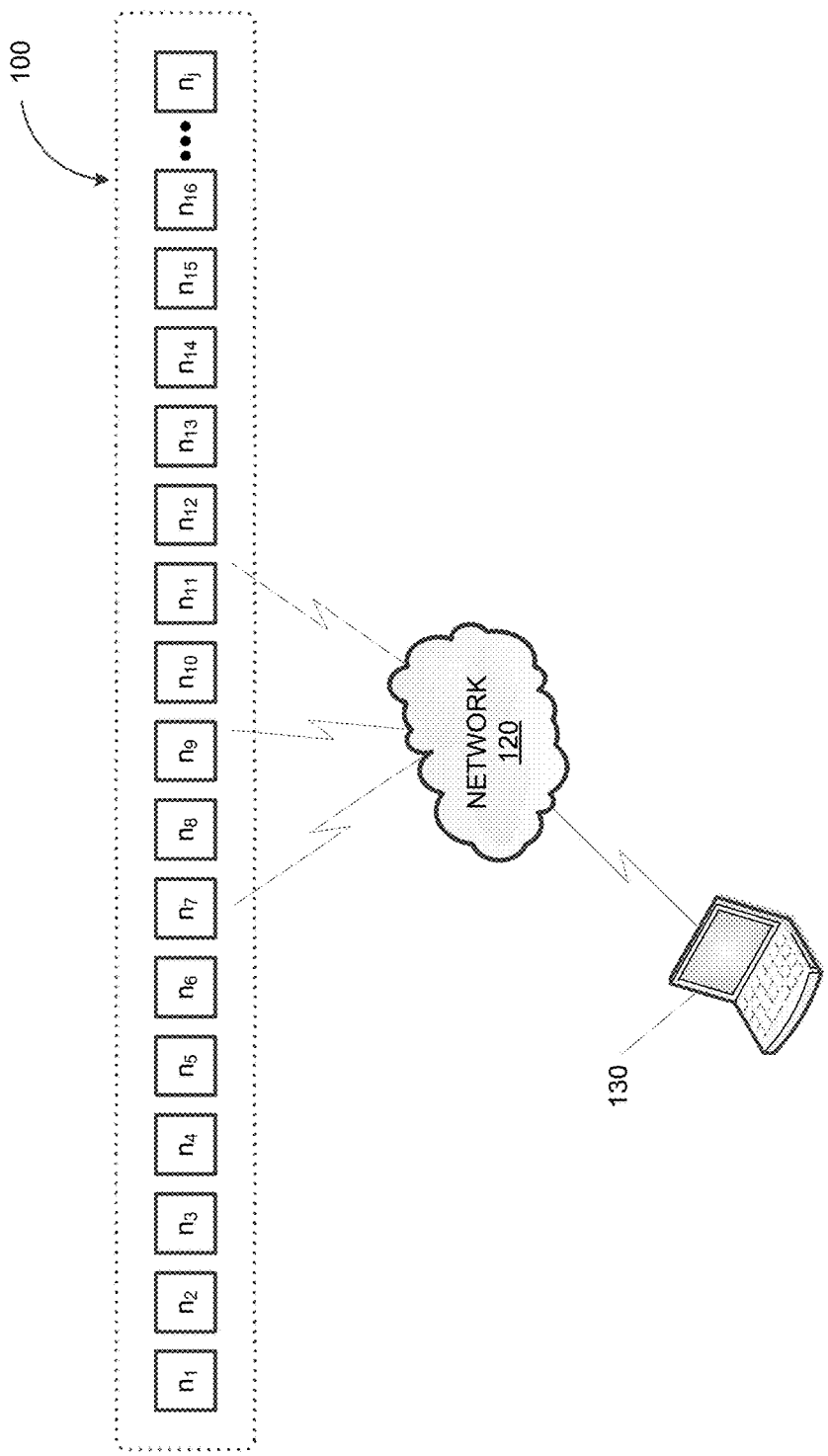
FIG. 1 depicts a network diagram illustrating a distributed database system consistent with implementations of the current subject matter.

Like labels are used to refer to same or similar items in the drawings.

DETAILED DESCRIPTION

As noted above, messages can be exchanged amongst multiple nodes in a distributed database system in order to coordinate the execution of a query in accordance with an execution plan. For example, one sender node can broadcast a message to a plurality of recipient nodes. Meanwhile, the recipient nodes can send response messages back to the sender node. But sending the message directly between the sender node and each recipient node can require an excessive number of connections to be established between individual nodes. For instance, a direct distribution scheme may require the sender node to establish a connection with every recipient node, which may be both time consuming and resource intensive.

In some implementations of the current subject matter, messages in a distributed database system are disseminated through a hierarchy of clustered nodes. For instance, the nodes in the distributed database system can be grouped into different clusters, which can be further grouped into additional sub-clusters. At least one gateway node can be selected for each cluster. As such, instead of a sender node sending a message directly to each recipient node, the message can be routed iteratively to the recipient nodes via a series of gateway node. This hierarchical distribution scheme can avoid an excessive number of connections between individual nodes, thereby conserving both time and computing resources. For example, the sender node may be able to reach multiple recipient nodes via a single gateway node. Moreover, the connections to the gateway nodes may be reused for subsequent messages from the sender to the same recipient nodes and/or response messages from the recipient nodes back to the sender node).

In some implementations of the current subject matter, the hierarchy of clustered nodes can be changed dynamically. For example, the grouping of nodes into different clusters can be performed periodically and/or on demand (e.g., by a sender node at the sending of each message). Moreover, the selection of gateway nodes can be updated periodically (e.g., based on a schedule) and/or on demand. As such, different and/or additional gateway nodes can be selected in response to changes in distributed database system including, for example, node status (e.g., defective, offline) and load.

FIG. 1 depicts a network diagram illustrating a distributed database system 100 consistent with implementations of the current subject matter. Referring to FIG. 1, the distributed database system 100 can include a j number of nodes (e.g., $n_1$ through $n_j$). The nodes $n_1$ through $n_j$ can be communicatively coupled via a wired and/or wireless network 120. The wired and/or wireless network 120 can be a wide area network (WAN), a local area network (LAN), and/or the Internet. The distributed database system 100 can include any number of nodes without departing from the scope of the present disclosure.

In some implementations of the current subject matter, a client 130 can communicate with the distributed database system 100 via the wired and/or wireless network 120. For instance, the client 130 can submit a query to the distributed database system 100. Data in the distributed database system 100 can be stored and/or managed across different nodes (e.g., one or more of the nodes $n_1$ through $n_j$). As such, fulfilling the query from the client 130 can require one or more of the nodes $n_1$ through $n_j$ to each perform at least some of the operations necessary to execute the query. For instance, the node $n_1$ (or a different node) may be a scheduler node configured to generate an execution plan for the query. Meanwhile, one or more other nodes may act as worker nodes and may fulfill the query by performing the operations specified by the execution plan. The nodes involved in the execution of the query may exchange messages (e.g., control messages) in order to coordinate the execution of the query from the client 130.

Figure 2:
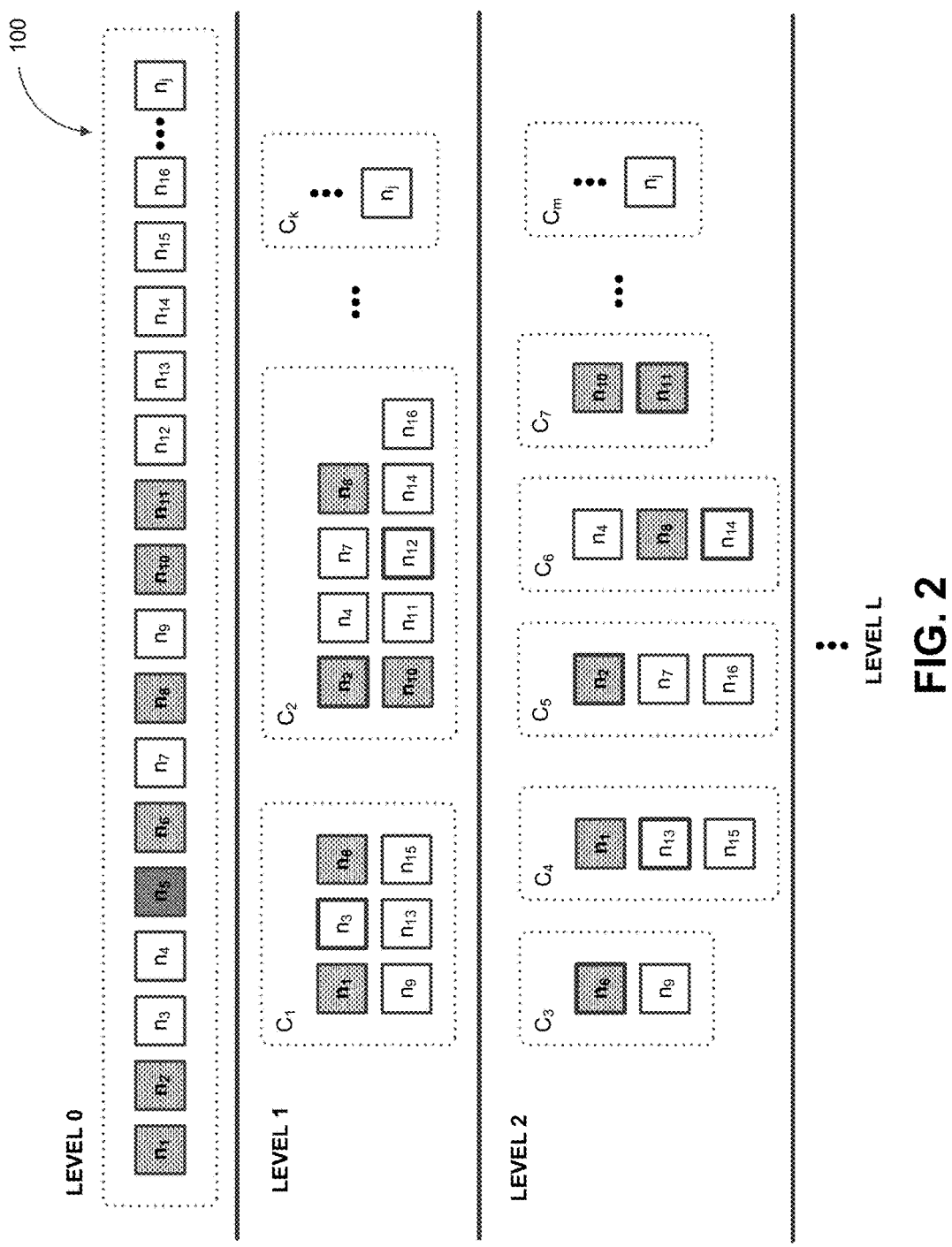
FIG. 2 illustrates a clustering of nodes in a distributed database system consistent with implementations of the current subject matter.

FIG. 2 illustrates a clustering of nodes in the distributed database system 100 consistent with implementations of the current subject matter. Referring to FIG. 2, the distributed database system 100 can include the nodes $n_1$ through $n_j$. As shown in FIG. 2, a sender node $n_5$ can broadcast a message to a plurality of recipient nodes including, for example, the nodes $n_1$, $n_2$, $n_6$, $n_8$, $n_{10}$, and $n_{11}$.

In some implementations of the current subject matter, the sender node $n_5$ can group the nodes in the distributed database system 100 into a plurality of clusters. For instance, the sender node $n_5$ can group the nodes in the distributed database system 100 into a first level of clusters (e.g., Level 1). As shown in FIG. 2, Level 1 can include one or more clusters including, for example, the cluster $C_1$ and the cluster $C_2$. The sender node $n_5$ can select at least one gateway node for each of the clusters $C_1$ and $C_2$ in Level 1. For instance, the node $n_3$ may be selected as the gateway node for the cluster $C_1$ while the node $n_2$ and/or the node $n_{12}$ may be selected as the gateway node(s) for the cluster $C_2$. According to some implementations of the current subject matter, the sender node $n_5$ can select more than one gateway node for a single cluster (e.g., both $n_2$ and $n_{12}$ for the cluster $C_2$) in order to balance the message load across multiple gateway nodes. As such, some messages destined for recipient nodes grouped in the cluster $C_2$ (e.g., the recipient nodes $n_2$, $n_8$, and $n_{10}$) may be routed through the gateway node $n_2$ while other messages may be routed through the gateway node $n_{12}$.

In some implementations of the current subject matter, instead of broadcasting the message directly to each recipient node, the sender node $n_5$ can send the message to the gateway nodes in each of the clusters $C_1$ and $C_2$. For example, the sender node $n_5$ can send the message to the gateway nodes $n_3$ instead of directly to the recipient nodes $n_1$ and $n_{15}$. Similarly, the sender node $n_5$ can send the message to the gateway nodes $n_2$ or $n_{12}$ instead of directly to the recipient nodes $n_2$, $n_8$, and $n_{10}$. According to some implementations of the current subject matter, the transmission of messages to a gateway node can be parallelized. That is, the sender node $n_5$ can establish multiple connections with a single gateway node (e.g., gateway nodes $n_2$, $n_3$, and $n_{12}$) such that the sender node $n_5$ can simultaneously send multiple messages to the same gateway node.

In some implementations of the current subject matter, a gateway node is adapted to route the message from a sender node to the recipient nodes in a corresponding cluster. For example, the gateway node $n_3$ may route the message from the sender node $n_5$ to the recipient nodes $n_1$ and $n_6$ in the cluster $C_1$. Meanwhile, the gateway node $n_2$ (or $n_{12}$) may route the message from the sender node $n_5$ to the recipient nodes $n_2$, $n_8$, and $n_{10}$ in the cluster $C_2$.

According to some implementations of the current subject matter, the clustering of nodes and the routing of messages to a recipient node via one or more gateway nodes may iterate over multiple levels of clusters until the message is delivered to a recipient node of the message. That is, a gateway node at one level can further group the nodes in a corresponding cluster to form one or more lower level sub-clusters. For instance, as shown in FIG. 2, the gateway node $n_3$ may be a Level 1 gateway node that receives a message from the sender node $n_5$. The gateway node $n_3$ can further route the message by grouping the nodes in the cluster $C_1$ from Level 1 into a plurality of sub-clusters including, for example, the Level 2 clusters $C_3$ and $C_4$. Moreover, the Level 1 gateway node $n_3$ can select additional gateway nodes for each of the Level 2 clusters $C_3$ and $C_4$. For example, the node $n_6$ may be selected as the gateway node for the cluster $C_3$ while the node $n_{13}$ may be selected as the gateway node for the cluster $C_4$. The Level 1 gateway node $n_3$ can route the message to the recipient nodes by sending the message to the Level 2 gateway nodes $n_6$ and $n_{13}$. As shown in FIG. 2, the gateway node $n_6$ may itself be a recipient node, in which case the distribution process can terminate at the gateway node $n_6$. By contrast, the gateway node $n_{13}$ may continue routing the message including by forwarding the message onto the recipient nodes $n_1$ and $n_{15}$ in the cluster $C_4$.

Similarly, the Level 1 gateway node $n_2$ (or $n_{12}$) can further group the nodes from the cluster $C_2$ into the clusters $C_5$, $C_6$, and $C_7$. The same clustering technique can be used at the same level in order to achieve a consistent grouping of nodes at the next level. Thus, the Level 1 gateway node $n_2$ (or $n_{12}$) uses the same clustering technique as the other Level 1 gateway nodes (e.g., the gateway node $n_3$) in order to generate the clusters $C_5$, $C_6$, and $C_7$. For each of the clusters $C_5$, $C_6$, and $C_7$, the gateway node $n_2$ (or $n_{12}$) can select the gateway nodes (e.g., the gateway nodes $n_2$, $n_{11}$, and $n_{14}$) that are used to further route the message from the sender node $n_5$ to the recipient nodes $n_2$, $n_8$, and $n_{10}$. For example, the Level 1 gateway node $n_2$ (or $n_{12}$) can route the message to the recipient node $n_8$ by sending the message to the Level 2 gateway node $n_{14}$ of the cluster $C_6$. The Level 1 gateway node $n_2$ (or $n_{12}$) can also route the message to the recipient nodes $n_{10}$ and $n_{11}$ by routing the message to the Level 2 gateway node $n_{11}$ of the cluster $C_7$.

It should be appreciated that a message from a sender node (e.g., the sender node $n_5$) can be routed through any number of gateway nodes, clusters, and levels without departing from the scope of the present disclosure. For instance, as shown in FIG. 2, the j number of nodes in distributed database system 100 may be grouped into a k number of clusters (e.g., at Level 2) over an L number of levels. As such, the message from the sender node $n_5$ may be routed through one or more gateway nodes at each of the L number of levels until the message is delivered to all the recipient nodes $n_1$, $n_2$, $n_6$, $n_8$, $n_{10}$, $n_{11}$, and $n_{15}$.

Figure 3:
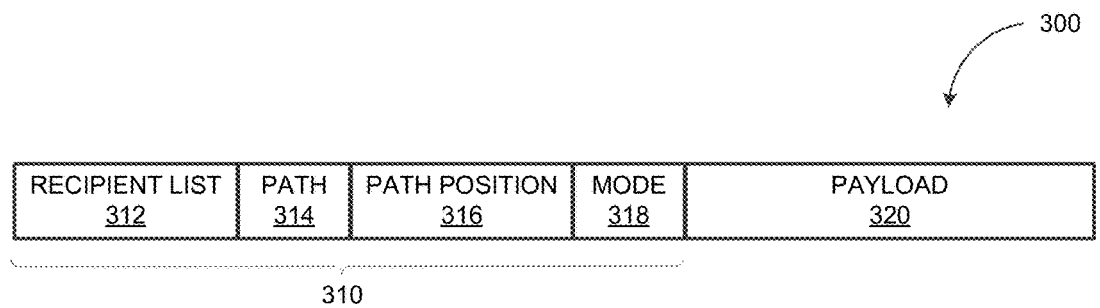
FIG. 3 illustrates a format of a message consistent with implementations of the current subject matter.

FIG. 3 illustrates a format of a message 300 consistent with implementations of the current subject matter. Referring to FIGS. 1-3, the message 300 may be exchanged between the nodes $n_1$ through $n_j$. For instance, the sender node $n_5$ can route the message 300 to a plurality of recipient nodes $n_1$, $n_2$, $n_6$, $n_8$, $n_{10}$, $n_{11}$, and $n_{15}$ via one or more levels of gateway nodes.

As shown in FIG. 3, the message 300 can include a header 310 and a payload 320. The payload 320 can include one or more instructions for operations that a recipient node is required to perform in order to fulfill a query (e.g., from the client 130). Alternately or additionally, the payload 320 can include a result and/or outcome of the operations performed by a recipient node.

The header 310 of the message 300 can include a recipient list 312, a path 314, a path position 316, and a transport mode 318. In some implementations of the current subject matter, the recipient list 312 can enumerate the recipient nodes for the message 300. For instance, the recipient list 312 can include the recipient nodes $n_1$, $n_2$, $n_6$, $n_8$, $n_{10}$, $n_{11}$, and $n_{15}$ indicating that the message 300 should be delivered to the recipient nodes $n_1$, $n_2$, $n_6$, $n_8$, $n_{10}$, $n_{11}$, and $n_{15}$. Each node in the distributed database system 100 can be associated with an identifier. As such, the recipient list 312 can refer to different nodes using the identifiers associated with the individual nodes. A node receiving the message 300 can determine, based on the contents of the recipient list 312, whether that node is a recipient node and/or a gateway node for the message 300. It should be appreciated that a node can be both a gateway node and a recipient node. As such, a node can appear in the recipient list 312 and be required to further dispatch the message 300 to one or more other recipient nodes.

The path 314 indicates the nodes (e.g., the gateway nodes at different levels) that the message 300 is routed through as the message 300 is transmitted from the sender node to the recipient node. The nodes in the path 314 can also be specified based on the identifiers associated with the individual nodes. In some implementations of the current subject matter, the path 314 can be an ordered list of nodes. For example, the path 314 of the message 300 can include the sender node $n_5$, the Level 1 gateway node $n_3$, and the Level 2 gateway node $n_{13}$ if the message 300 is sent from the sender node $n_5$ to the recipient node $n_1$.

According to some implementations of the current subject matter, the path 314 can be generated and/or updated when the message 300 is first routed between a sender node and a recipient node. Once the path 314 is established between a sender node and a recipient node, the path 314 can be reused. For example, the path 314 can be generated and/or updated when the message 300 is first routed from the sender node $n_5$ to the recipient node $n_1$. The same path 314 can be reused for the subsequent bilateral exchange messages between the sender node $n_5$ and the recipient node $n_1$ including, for example, additional messages from the sender node $n_5$ to the recipient node $n_1$ and response messages from the recipient node $n_1$ back to the sender node $n_5$.

The path position 316 can indicate a progress of the distribution of the message 300 along the path 314. For instance, the gateway node $n_3$ may receive the message 300 from the sender node $n_5$ and update the path position 316 to indicate that message 300 is currently at the node $n_3$. According to some implementations of the current subject matter, the path position 316 can be used to track the progress of the message 300 when the path 314 is being reused to route the message 300.

In some implementations of the current subject matter, the transport mode 318 can indicate how the message 300 should be transmitted. The transport mode 318 can indicate that the message 300 should be broadcast to all the recipient nodes in the recipient list 312. A new path to the recipient nodes can be generated when the message 300 is set to be broadcast to the recipient nodes in the recipient list 312. Alternately, the transport mode 318 can indicate that the message 300 should be forwarded to a node along the path 314 when the path 314 is being reused. For instance, the transport mode 318 can indicate whether the last node to receive the message 300 should forward the message 300 to a previous node or a next node along the path 314.

According to some implementations of the current subject matter, the path position 316 and the transport mode 318 can be implemented as a single integer value. For example, the integer can have a value of zero to indicate that the message 300 should be broadcast to all the recipient nodes in the recipient list 312. The integer can have a negative value if the message 300 should be forwarded to a previous node along the path 314 and a positive value if the message 300 should be forwarded to a next node along the path 314. Meanwhile, an absolute value of the integer can correspond to path position 316 of the message 300 and indicate the current progress of the message 300 along the path 314.

Figure 4:
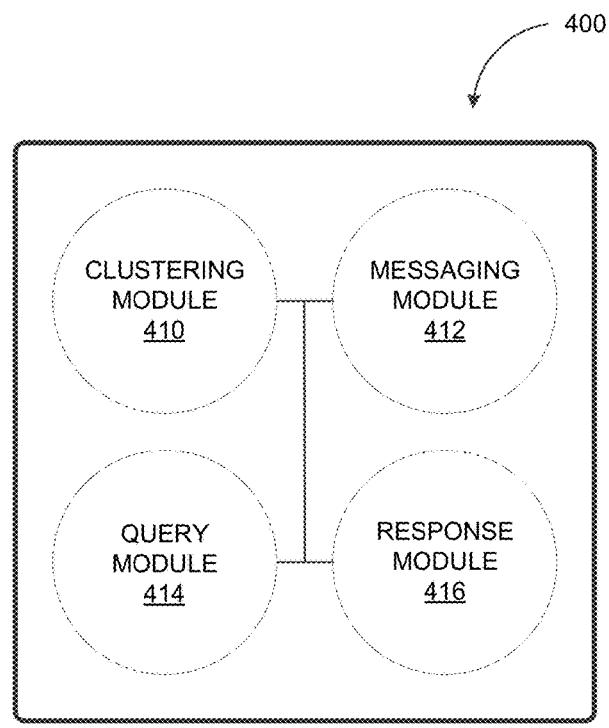
FIG. 4 depicts a block diagram illustrating a node in a distributed database system consistent with implementations of the current subject matter.

FIG. 4 depicts a block diagram illustrating a node 400 in a distributed database system consistent with implementations of the current subject matter. Referring to FIGS. 1-4, the node 400 can implement one or more of the nodes $n_1$ through $n_j$ in the distributed database system 100. For instance, the node 400 can implement the sender node $n_5$ as well as the gateway nodes $n_2$, $n_3$, $n_6$, $n_{11}$, $n_{12}$, $n_{13}$, and/or $n_{14}$. As shown in FIG. 4, the node 400 can include a programmable processor and/or computer hardware configured to implement a clustering module 410, a messaging module 412, a query module 414, and a response module 416. Alternately or additionally, the node 400 (e.g., the clustering module 410, the messaging module 412, the query module 414, and the response module 416) can be a virtual node implemented on one or more programmable processors.

In some implementations of the current subject matter, the clustering module 410 can be configured to group a plurality of nodes in a distributed database system into one or more clusters. For example, the clustering module 410 can be configured to group the j number of nodes in the distributed database system 100 into one or more clusters (e.g., the clusters $C_1$ and $C_2$). According to some implementations of the current subject matter, the clustering module 410 may be configured to group the plurality of nodes using a hash-based clustering technique. For instance, one or more hash functions can be applied to an identifier associated with each node in order to group the nodes into one or more clusters. Alternately or additionally, the clustering module 410 can group the plurality of nodes based on one or more characteristics associated with the nodes including, for example, technical properties (e.g., latency at each node). The same clustering technique may be applied across each level in order to maintain a consistent grouping of nodes at the next level. For example, the Level 1 gateway nodes $n_2$, $n_3$, and $n_{12}$ may apply the same clustering technique when generating the Level 2 clusters $C_3$, $C_4$, $C_5$, $C_6$, and $C_7$.

In some implementations of the current subject matter, the clustering module 410 can be further configured to select at least one node to act as the gateway node of each cluster. For instance, the sender node $n_5$ can select the node $n_3$ as the gateway node for cluster $C_1$. According to some implementations of the current subject matter, more than one gateway node can be selected for a single cluster in order to balance the message load across multiple gateway nodes. For example, the sender node $n_5$ can select both the nodes $n_2$ and $n_{12}$ to act as the gateway node for the cluster $C_2$. Some messages destined for recipient nodes in the cluster $C_2$ (e.g., the recipient nodes $n_2$, $n_8$, and $n_{10}$) may be routed through the gateway node $n_2$ while other messages may be routed through the gateway node $n_{12}$.

The messaging module 412 can be configured to route one or more messages received at the node 400. According to some implementations of the current subject matter, the messaging module 412 can determine the routing for a message based on the header of the message. For instance, the messaging module 412 can examine the header 312 of the message 300. The messaging module 412 can determine, based on the recipient list 312, whether the node 400 is a recipient node of the message 300 and/or a gateway node that further routes the message 300 to one or more recipient nodes in the recipient list 312. In the event that the node 400 is determined to be a gateway node, the messaging module 412 can be configured to determine the one or more nodes to which further transmit the message.

In some implementations of the current subject matter, the messaging module 412 can determine, based on the transport mode 318, whether to broadcast the message 300 (e.g., to the recipient nodes in the recipient list 312) or forward the message 300 by reusing the established path 314. If the transport mode 318 indicates that the message should be broadcasted, the messaging module 412 can be configured to identify one or more gateway nodes through which to route the message 300. Alternately, if the transport mode 318 indicates that the message 300 should be forwarded along the established path 314 (e.g., to a previous node or a next node along the path 314), the messaging module 412 can be configured to transmit the message 300 to a previous node or a next node in the path 314.

The query module 414 can be configured to execute one or more operations associated with a query (e.g., from the client 130). For instance, the query can be executed in accordance to an execution plan, which sets forth the individual operations required to fulfill the query as well as the interdependencies amongst the operations. As data in the distributed database system 100 is stored and/or managed across multiple nodes (e.g., a plurality of the nodes $n_1$ through $n_j$), messages may be dispatched to individual nodes instructing the nodes to perform one or more specific operations to fulfill the query. For example, the payload of a message can include instructions to perform one or more operations. If the node 400 is a recipient node for the message, then the node 400 can respond to the message at least by performing the operations instructed by the message.

In some implementations of the current subject matter, the response module 416 can be configured to generate a response message to the message including by generating a header and a payload for the response message. The payload of the response message may include a result and/or outcome of the operations that are performed in response to and/or as instructed by the message. The header of the response message can include the same path 314 of the message 300. In addition, the transport mode of the response message can be set (e.g., to a negative value integer) to indicate that the response message should be transmitted to the previous node along the path 314. As such, the same path 314 can be used to route the response message back to the sender node $n_5$, thereby reusing at least some of the connections that had established to route the message 300 to the node 400.

Figure 5A:
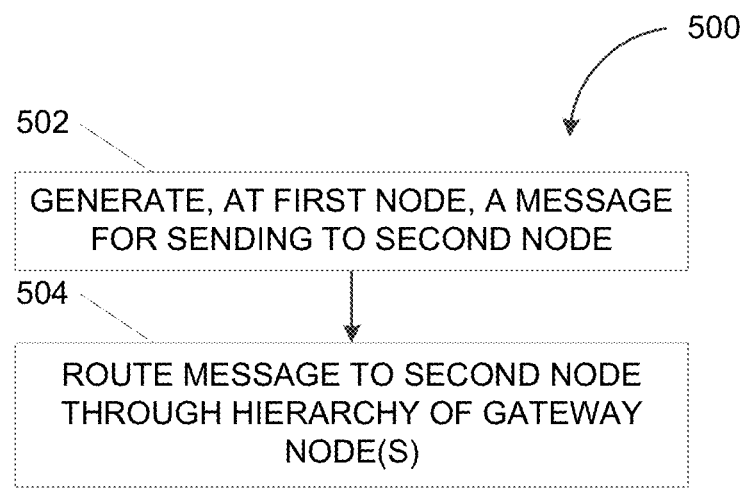
FIG. 5A depicts a flowchart illustrating a process for sending a message consistent with implementations of the current subject matter.

FIG. 5A depicts a flowchart illustrating a process 500 for sending a message consist with implementations of the current subject matter. Referring to FIGS. 1-5A, the process 500 can be performed by the node 400, which can implement one or more of the nodes $n_1$ through $n_j$ in the distributed database system 100. The process 500 can be performed by the node 400 when the node 400 is serving as a scheduler node in the distributed database system 100.

A first node can generate a message for sending to at least a second node (502). For example, the sender node $n_5$ can generate the message 300 for broadcast to the recipient nodes $n_1$, $n_2$, $n_6$, $n_8$, $n_{10}$, $n_{11}$, and $n_{15}$. As such, the recipient list 312 of the message 300 can include the recipient nodes $n_1$, $n_2$, $n_6$, $n_8$, $n_{10}$, $n_{11}$, and $n_{15}$. The transport mode 318 of the message 300 can be set to indicate that the message 300 should be broadcast to all the recipient nodes in the recipient list 312. In addition, the sender node $n_5$ can update the path 314 to include the sender node $n_5$ (e.g., as an initial entry). According to some implementations of the current subject matter, updating the path 314 establishes a path between two nodes (e.g., the sender node sender node $n_5$ and a recipient node) such that the same path 314 can be reused again for subsequent transmission of messages between the two nodes.

The first node can route the message to the second node through a hierarchy of one or more gateway nodes (504). For instance, the sender node $n_5$ can route the message 300 to each of the recipient nodes $n_1$, $n_2$, $n_6$, $n_8$, $n_{10}$, $n_{11}$, and $n_{15}$ at least by routing the message 300 to the Level 1 gateway nodes $n_3$ and $n_2$ (or $n_{12}$). The message 300 can be iteratively routed through subsequent levels of gateway notes (e.g., the Level 2 gateway nodes $n_2$, $n_6$, $n_{11}$, $n_{13}$, and $n_{14}$) until the message 300 is delivered to each recipient node $n_1$, $n_2$, $n_6$, $n_8$, $n_{10}$, $n_{11}$, and $n_{15}$. It should be appreciated that the contents of the message 300 can be altered by the recipient nodes and/or gateway nodes that receives the message 300. For example, a recipient node of the message 300 can remove that recipient node from the recipient list 312 before further routing the message 300 (e.g., to one or more other recipient nodes). Meanwhile, a gateway node can update the path 314 of the message 300 before the gateway node further routes the message 300.

According to some implementations of the current subject matter, the sender node $n_5$ can determine to route the message 300 via a new path, in which case the sender node $n_5$ can set the transport mode 318 of the message 300 to indicate a broadcast mode. When the message 300 is sent in the broadcast mode, the gateway nodes at each level of the hierarchy along the path of the message 300 can be configured to select (or reselect) one or more subsequent gateway nodes (e.g., at a next level) for routing the message. The gateway nodes traversed by the message 300 along the way can be added to the path 314, thereby generating a new path 314 for subsequent reuse. By contrast, the sender node $n_5$ can alternately determine to route the message 300 via an established path. As such, the sender node $n_5$ can set the transport mode 318 to indicate that the existing path 314 should be reused. When the message 300 is sent via an existing path, the message 300 can be routed from the sender node $n_5$ to a recipient node via the gateway nodes already set forth in the path 314.

FIG. 5B depicts a flowchart illustrating a process 550 for sending a message consistent with implementations of the current subject matter. Referring to FIGS. 1-4 and 5B, the process 550 can be performed by the node 400, which can implement one or more of the nodes $n_1$ through $n_j$ in the distributed database system 100. The process 550 can be performed by the node 400 when the node 400 is serving as a worker node in the distributed database system 100.

A first node can receive, from a second node, a message (552). For example, the Level 1 gateway node $n_3$ can receive the message 300 from the sender node $n_5$.

The first node can determine whether to reuse a path included with the message for routing the message to one or more recipient nodes (553). For example, the gateway node $n_3$ can examine the transport mode 318 of the message 300 to determine whether the path 314 can be reused to route the message 300 from the sender node $n_5$ to a recipient node. The transport mode 318 can be set to "broadcast," which indicates that an existing path included in the message 300 (if any) should not be reused. By contrast, the transport mode 318 can also be set to indicate that the path 314 should be reused to route the message. For instance, the transport mode 318 can be set to indicate whether the path 314 should be reused to route the message from the sender node $n_5$ to a recipient node or back to the sender node $n_5$.

Alternately or additionally, the gateway node $n_3$ can examine the recipient list 312 of the message 300 to determine whether to reuse the path 314 to route the message 300 from the sender node $n_5$ to a recipient node. For instance, the recipient list 312 may be undefined (e.g., set to null) in the event that the path 314 should be reused to route the message 300 from the sender node $n_5$ to a recipient node.

If the first node determines to reuse the path routing the message to one or more recipient nodes (553-Y), the first node can use the path included in the message to route the message to one or more recipient nodes of the message (554). For example, the transport mode 318 and/or the recipient list 312 can indicate that the path 314 should be reused for routing the message 300. Meanwhile, the transport mode 318 can further indicate whether the message 300 should be forwarded to a next node along the path 314 (e.g., the Level 2 gateway node $n_5$ or $n_{13}$) or a previous node along the path 314 (e.g., the sender node $n_5$). Accordingly, the gateway node $n_3$ can route the message 300 by forwarding the message 300 to a previous node along the path 314 or a next node along the path 314.

Alternately, the first node can determine not to reuse the path for routing the message to one or more recipient nodes of the message (553-N). For example, the transport mode 318 of the message 300 can be set to a broadcast mode, in which case the gateway node $n_3$ does not reuse an existing path for routing the message 300. Instead, the $n_3$ can generate a new path for routing the message 300 between the sender node $n_5$ and a recipient node. As such, the first node can update the path included in the message by at least adding the first node to the path (556). For instance, the gateway node $n_3$ can update the path 314 of the message 300 by adding the gateway node $n_3$ to the path 314. According to some implementations of the current subject matter, the path 314 can be updated at each node along the path of the message 300 between the sender node $n_5$ and a recipient node in order to generate a new path 314. This new path 314 can be reused for subsequent messages between the sender node $n_5$ and that recipient node.

The first node can determine whether the first node is a recipient node of the message (557). For example, when the message 300 is being broadcast by the sender node $n_5$ (e.g., as indicated by the transport mode 318), the gateway node $n_3$ can determine whether the gateway node $n_3$ is a recipient of the message 300 by at least examining the recipient list 312 of the message 300. The gateway node $n_3$ is a recipient node of the message 300 if the gateway node $n_3$ is include in the recipient list 312 of the message 300. Alternately, if the gateway node $n_3$ is not included in the recipient list 312, then the gateway node $n_3$ is not a recipient of the message 300. As such, the gateway node $n_3$ acts as a gateway node to further route the message 300 onto the recipient nodes included in the recipient list 312. In some implementations of the current subject matter, the gateway node $n_3$ can be both a recipient node and a gateway node.

If the first node determines that the first node is not a recipient node of the message (557-N), the first node can route the message to one or more recipient nodes through a hierarchy of one or more gateway nodes (558). For example, the gateway node $n_3$ can further route the message 300 to the recipient nodes $n_1$ and $n_6$ included in the same cluster $C_1$ as the gateway node $n_3$. In some implementations of the current subject matter, the message 300 can be iteratively routed through subsequent levels of gateway nodes (e.g., the Level 2 gateway nodes $n_2$, $n_6$, $n_{11}$, $n_{13}$, and $n_{14}$) until the message 300 reaches each recipient node.

Alternately or additionally, the first node can determine that the first node is a recipient node of the message (557-Y). As such, the first node can update the message by at least removing the first node from the recipient list (560). For example, if the gateway node $n_3$ is a recipient that appears in the recipient list 312 of the message 300, the gateway node $n_3$ can remove the gateway node $n_3$ from the recipient list 312.

The first node can further determine whether there are additional recipient nodes for the message (561). For example, the gateway node $n_3$ can examine the recipient list 312 to determine if there are any remaining recipient nodes in the recipient list 312. If the first node determines that there are no additional recipients for the message (561-N), the process 550 can terminate.

Alternately, if the first node determines that there are additional recipient nodes for the message (561-Y), the process 500 can continue at operation 558. That is, the first node can route the message to one or more recipient nodes through a hierarchy of one or more gateway nodes (558). For example, the gateway node $n_3$ can determine that the recipient list 312 contains additional recipient nodes (e.g., the recipient nodes $n_1$ and $n_6$). As such, the gateway node $n_3$ can further route the message 300 to the recipient nodes $n_1$ and $n_6$ included in the same cluster $C_1$ as the gateway node $n_3$. In some implementations of the current subject matter, the message 300 can be iteratively routed through subsequent levels of gateway nodes (e.g., the Level 2 gateway nodes $n_2$, $n_6$, $n_{11}$, $n_{13}$, and $n_{14}$) until the message 300 reaches each recipient node.

Figure 6:
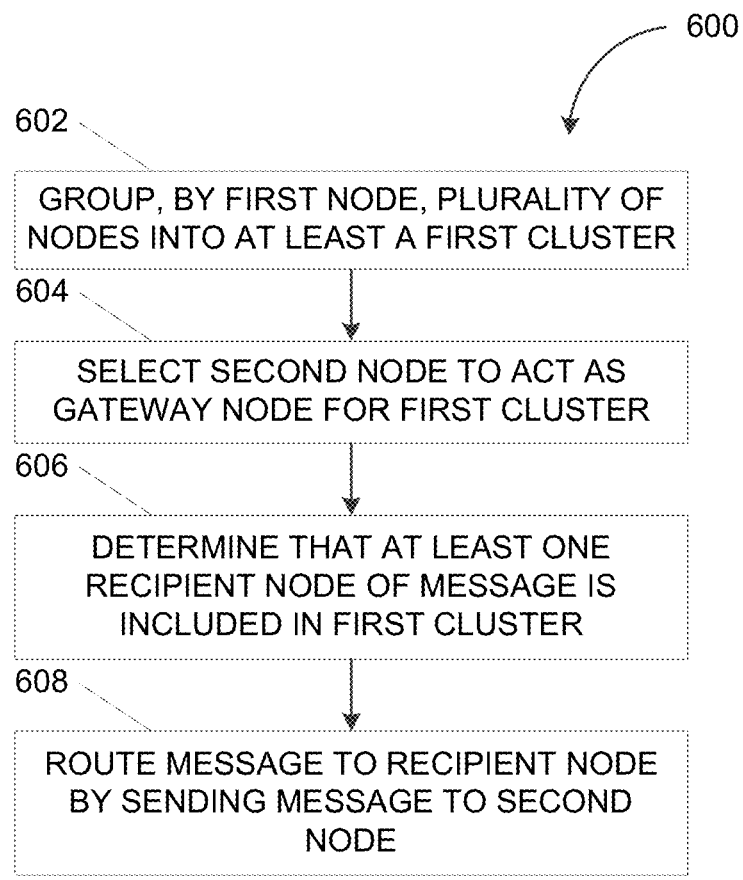
FIG. 6 depicts a flowchart illustrating a process for routing a message through a hierarchy of gateway nodes consistent with implementations of the current subject matter.

FIG. 6 depicts a flowchart illustrating a process 600 for routing a message through a hierarchy of gateway nodes consistent with implementations of the current subject matter. Referring to FIGS. 1-6, the process 600 can be performed by the node 400, which can implement one or more of the nodes $n_1$ through $n_j$ in the distributed database system 100. In some implementations of the current subject matter, the process 600 can implement operation 504 of the process 500 and/or operation 558 of the process 550.

A first node can group a plurality of nodes into at least a first cluster (602). In some implementations of the current subject matter, the nodes in a distributed database system can be grouped into a hierarchy of clusters and sub-clusters. For example, the sender node $n_5$ can group the nodes $n_1$ through $n_j$ in the distributed database system 100 into at least two Level 1 clusters $C_1$ and $C_2$. Meanwhile, the Level 1 gateway node $n_3$ can group the nodes in the cluster $C_1$ into the Level 2 clusters $C_3$ and $C_4$. Similarly, the Level 1 gateway node $n_2$ or $n_{12}$ can group the nodes in the cluster $C_2$ into the Level 2 clusters $C_5$, $C_6$, and $C_7$.

The first node can select a second node to act as a gateway node for the first cluster (604). In some implementations of the current subject matter, at least one gateway node can be selected for each cluster of nodes. For example, the sender node $n_5$ can select the node $n_3$ to act as the gateway node for the cluster $C_1$. However, the sender node $n_5$ can select more than one node to act as the gateway node for a single cluster. Doing so allows the message load to be distributed across multiple nodes. For instance, the sender node $n_5$ can select both node $n_2$ and $n_{12}$ to act as the gateway node for the cluster $C_2$.

The first node can determine that at least one recipient node of a message is included in the first cluster (606). For example, the sender node $n_5$ can send the message 300 to a plurality of recipient nodes including, for example, the recipient nodes $n_1$ and $n_6$. The sender node $n_5$ can determine that both the recipient nodes $n_1$ and $n_6$ are part of the cluster $C_1$. Similarly, the message 300 can be routed by the sender node $n_5$ via the gateway node $n_3$ to the recipient nodes $n_1$ and $n_6$. Here, the gateway node $n_3$ can determine that the recipient node $n_1$ is included in the cluster $C_4$ and the recipient node $n_6$ is included in the cluster $C_3$.

The first node can route the message to the recipient node by at least sending the message to the gateway node of the first cluster (608). For instance, the sender node $n_5$ can route the message 300 to the recipient nodes $n_1$ and $n_6$ by sending the message 300 to the Level 1 gateway node $n_3$. The sender node $n_5$ routes the message 300 via the Level 1 gateway node $n_3$ instead of sending the message 300 directly to the recipient nodes $n_1$ and $n_6$. Meanwhile, the gateway node $n_3$ can further route the message 300 to the recipient nodes $n_1$ and $n_6$ by sending the message 300 to the appropriate Level 2 gateway nodes. For example, the gateway node $n_3$ can route the message 300 to the recipient node $n_6$ by sending the message 300 to the node $n_6$, which is also the gateway node of the cluster $C_3$. Meanwhile, the gateway node $n_3$ can route the message 300 to the recipient node $n_1$ sending the message 300 to the Level 2 gateway node $n_{13}$.

Figure 7:
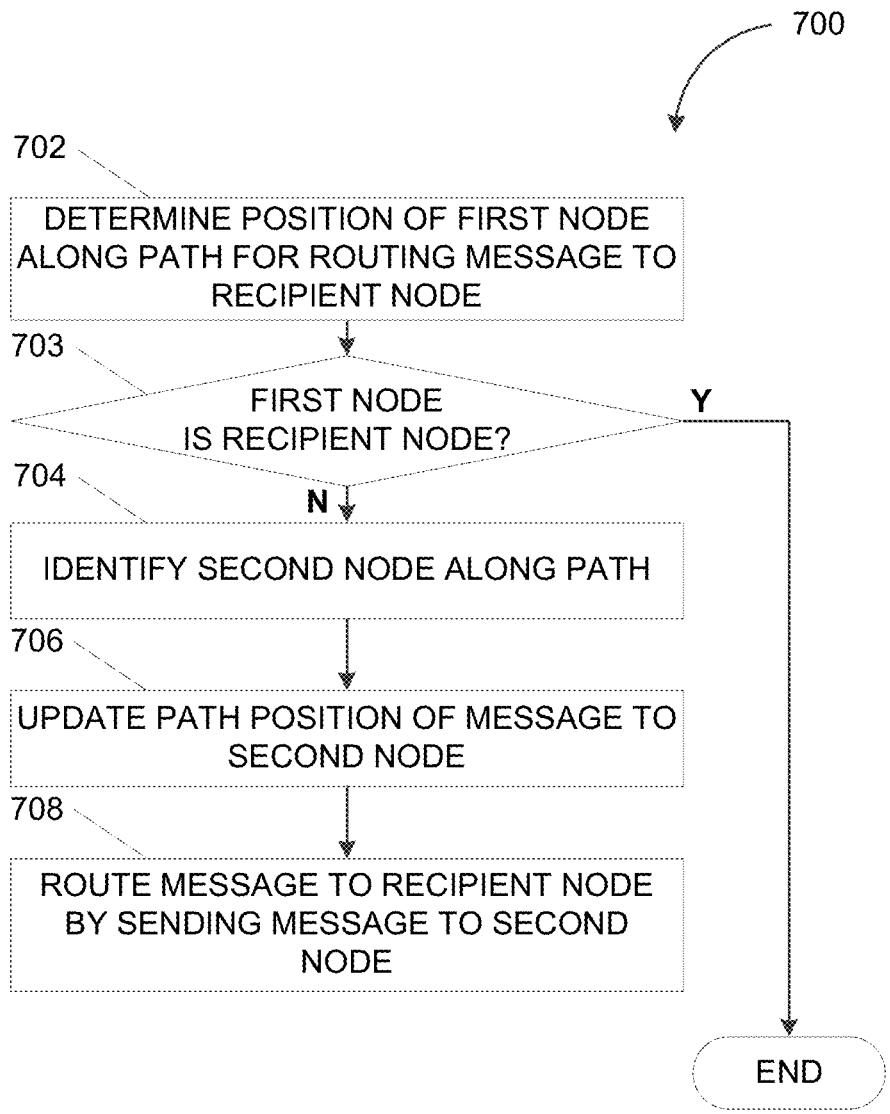
FIG. 7 depicts a flowchart illustrating a process for reusing an existing path to route a message consistent with implementations of the current subject matter.

FIG. 7 depicts a flowchart illustrating a process 700 for reusing an existing path to route a message consistent with implementations of the current subject matter. Referring to FIGS. 1-4, 5B, and 7, the process 700 can be performed by the node 400, which can implement one or more of the nodes $n_1$ through $n_j$ in the distributed database system 100. In some implementations of the current subject matter, the process 700 can implement operation 554 of the process 550.

A first node can determine a position of the first node along a path for routing a message to a recipient node (702). For example, the Level 2 gateway node $n_{13}$ can receive the message 300 (e.g., from the Level 1 gateway node $n_3$). The header 310 of the message 300 can include the path 314, which may be reused to route the message 300 from the sender node $n_5$ to the recipient node $n_1$. Alternately, the path 314 may be reused to route the message 300 from the recipient node $n_1$ back to the sender node $n_5$. The gateway node $n_{13}$ can examine the path 314 to determine its position along the path 314.

The first node can determine, based on the position of the first node along the path, whether the first node is the recipient node for the message (703). For example, the path 314 may be reused to route the message 300 from the sender node $n_5$ to the recipient node $n_1$. As such, the gateway node $n_{13}$ can determine whether it is a recipient node for the message 300 by determining whether the gateway node $n_{13}$ occupies a last position along the path 314. Alternately, the path 314 may be reused to route the message 300 from the recipient node $n_1$ back to the sender node $n_5$. In this scenario, the gateway node $n_{13}$ can determine whether it is a recipient node for the message 300 by determining whether the gateway node $n_{13}$ occupies a first position along the path 314.

If the first node determines that the first node is the recipient node for the message (703-Y), the process 700 can terminate. For example, the process 700 can terminate when the gateway node $n_{13}$ determines, based on the position of the gateway node $n_{13}$ along the path 314, that the gateway node $n_{13}$ is the recipient node for the message 300.

Alternately, if the first node determines that the first node is not the recipient node for the message (703-N), the first node can identify a second node along the existing path (704). For example, the gateway node $n_{13}$ can identify a second node along the existing path based at least in part on the transport mode 318 of the message 300. The second node can be a previous node along the path 314 (e.g., the Level 1 gateway node $n_3$) if the path 314 is being reused to route the message 300 back to the sender node $n_5$. Alternately, the second node can be a next node along the path 314 (e.g., the recipient node $n_1$) if the path 314 is being reused to route the message 300 from the sender node $n_5$ to the recipient node $n_1$.

The first node can update the path position of the message to the second node (706). For example, the gateway node $n_{13}$ can update the path position 316 of the message 300 to be the previous node (e.g., the Level 1 gateway node $n_3$) or the next node (e.g., the recipient node $n_1$) along the path 314.

The first node can route the message to the recipient node by sending the message to the second node along the path (708). For example, the gateway node $n_{13}$ can send the message 300 to the previous node (e.g., the Level 1 gateway node $n_3$) along the path 314 if the path 314 is being reused to route the message 300 back to the sender node $n_5$. Alternately, the gateway node $n_{13}$ can send the message 300 to the next node (e.g., the recipient node $n_1$) along the path 314 if the path 314 is being reused to route the message 300 from the sender node $n_5$ to the recipient node $n_1$.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:
1. A distributed database system, comprising:
a plurality of nodes, the plurality of nodes including a first node and a second node, each of the first node and the second node comprising at least one data processor and at least one memory storing instructions that result in a plurality of operations when executed by the at least one data processor, wherein the first node is configured to receive a query for execution at the distributed database system, the execution of the query requiring data stored at one or more of the plurality of nodes and in response to receiving the query, execute the query by at least grouping the plurality of nodes into at least a first cluster, select the second node to act as a gateway node for the first cluster determine that a recipient node of a message coordinating the execution of the query is included in the first cluster, and route the message to the recipient node by at least sending the message to the second node, and wherein the second node is configured to receive the message from the first node, determine, based on at least one of a transport mode and a recipient list of the message, not a reuse a path included with the message, and in response to determining not to reuse the path, determine, based at least in part on the recipient list, that the second node is not the recipient node of the message, and route the message to the recipient node of the message in response to determining that the second node is not the recipient node of the message.

2. The distributed database system of claim 1, wherein the first node is further configured to generate the message for broadcasting to one or more recipient nodes.

3. The distributed database system of claim 1, wherein the first node receives the message from a third node.

4. The distributed database system of claim 1, wherein the second node routes the message to the recipient node by at least:
grouping the first cluster into at least a second cluster;
selecting a third node to act as a gateway node for the second cluster;
determining that the recipient node of the message is included in the second cluster; and
routing the message to the recipient node by at least sending the message to the third node.

5. The distributed database system of claim 1, wherein the second node is further configured to:
in response to determining to not reuse the path, update the path included with the message by at least adding the second node to the path, wherein updating the path generates a new path that can be reused for routing one or more subsequent messages between a sender node and the recipient node of the message.

6. The distributed database system of claim 1, wherein the second node is further configured to:
determine, based on at least one of the transport mode and the recipient list of the message, to reuse the path included with the message; and
in response to determining to reuse the path:
determine, based at least in part on a position of the second node along the path, that the second node is not the recipient node of the message; and
in response to determining that the second node is not the recipient node of the message, route the message to the recipient node by at least sending the message to a third node along the path.

7. The distributed database system of claim 6, wherein the second node is further configured to identify the third node by at least determining, based least in part on the transport mode of the message, whether to route the message to a previous node along the path or a next node along the path.

8. The distributed database system of claim 1, wherein the first node is further configured to:
select a third node to act as another gateway node for the first cluster; and
determine send the message to the second node and not the third node in order to balance a load of messages between the second node and the third node.

9. The distributed database system of claim 1, wherein the first node is configured to:
establish a first connection and a second connection with the second node;
utilize the first connection to send the message to the second node; and
utilize the second connection to concurrently send a different message to the second node.

10. The distributed database system of claim 1, wherein the message comprises a header and a payload, and wherein the header of the message includes a transport mode of the message, a path associated with the message, a path position of the message, and a recipient list of the message.

11. The distributed database system of claim 1, wherein the first node is further configured to respond to receiving the query by at least:
generating an execution plan for the query; and
generating the message to include, in a payload of the message, at least a portion of the execution plan.

12. The distributed database system of claim 1, wherein the first node is further configured to:
determine a status of the second node;
select a third node to act as the gateway node for the first cluster, when the status of the second node is at least one of defective and offline; and
route the message to the recipient node by sending the message to the third node instead of the second node.

13. A computer-implemented method, comprising:
receiving, at a first node, a query for execution at a distributed database system, the distributed database system comprising a plurality of nodes that include the first node and a second node, and the execution of the query requiring data stored at one or more of the plurality of nodes;
responding, by the first node, to receiving the query by at least executing the query, wherein the first node executes the query by at least grouping the plurality of nodes into at least a first cluster, selecting the second node to act as a gateway node for the first cluster, determining that a recipient node of a message coordinating the execution of the query is included in the first cluster, and routing the message to the recipient node by at least sending the message to the second node;
receiving, at the second node, the message from the first node; and
responding, by the second node, to receiving the message by at least determining, based on at least one of a transport mode and a recipient list of the message, not to reuse a path included with the message, and in response to determining not to reuse the path, determining, based at least on the recipient list, that the second node is not the recipient node of the message, and routing the message to the recipient node of the message in response to determining that the second node is not the recipient node of the message.

14. The method of claim 13, wherein the second node routes the message to the recipient nodes by at least:
grouping, at the second node, the first cluster into at least a second cluster;

selecting a third node to act as a gateway node for the second cluster;

determining that the recipient node of the message is included in the second cluster; and routing the message to the recipient node by at least sending the message to the third node.

15. The method of claim 13, further comprising:

determining, based on at least one of the transport mode and the recipient list of the message, to reuse the path included with the message; and in response to determining to reuse the path:

determine, based at least in part on a position of the second node along the path, that the second node is not the recipient node of the message; and in response to determining that the second node is not the recipient node of the message, route the message to the recipient node by at least sending the message to a third node along the path.

16. A computer program product comprising a non-transitory machine-readable medium storing instructions which, when executed by at least one programmable processor, cause the at least one programmable processor to perform operations comprising:

receiving, at a first node, a query for execution at a distributed database system, the distributed database system comprising a plurality of nodes that include the first node and a second node, and the execution of the query requiring data stored at one or more of the plurality of nodes;

responding, by the first node, to receiving the query by at least executing the query, wherein the first node executes the query by at least grouping the plurality of nodes into at least a first cluster, selecting the second node to act as a gateway node for the first cluster, determining that a recipient node of a message coordinating the execution of the query is included in the first cluster, and routing the message to the recipient node by at least sending the message to the second node;

receiving, at the second node, the message from the first node; and responding, by the second node, to receiving the message by at least determining, based on at least one of a transport mode and a recipient list of the message, not to reuse a path included with the message, and in response to determining not to reuse the path, determining, based at least on the recipient list, that the second node is not the recipient node of the message, and routing the message to the recipient node of the message in response to determining that the second node is not the recipient node of the message.

17. The computer program product of claim 16, wherein the second node routes the message to the recipient node by at least:

grouping, at the second node, the first cluster into at least a second cluster;

selecting a third node to act as a gateway node for the second cluster;

determining that at least one the recipient node of the message is included in the second cluster; and routing the message to the recipient node by at least sending the message to the third node.

* * * * *